United States Patent

[11] 3,572,642

| [72] | Inventor | Bertil Waller |
| | | St. Eriksplan 15, Stockholm, Sweden |
| [21] | Appl. No. | 811,529 |
| [22] | Filed | Mar. 28, 1969 |
| [45] | Patented | Mar. 30, 1971 |
| [32] | Priority | Apr. 5, 1968, Jan. 20, 1969 |
| [33] | | Sweden |
| [31] | | 4601 and 658 |

[54] PURIFICATION OF WATER
9 Claims, 4 Drawing Figs.

[52] U.S. Cl............................................. 259/2
[51] Int. Cl............................................. B01f 15/04
[50] Field of Search......................................... 259/1, 2, 60, 18, 4, 36, 61, 62, 63; 210/205, 209

[56] References Cited
UNITED STATES PATENTS

| 1,249,614 | 12/1917 | Gibson............................ | 210/209 |
| 2,328,675 | 9/1943 | Ribbans......................... | 259/2 |
| 3,438,612 | 4/1969 | Knowlden..................... | 259/60 |

*Primary Examiner*—Robert W. Jenkins
*Attorney*—Richards & Geier

ABSTRACT: A device for mixing two or more liquids in predetermined portions with waste water is shown. A first container has a second container therewithin and is provided with an outlet. The second container is adapted to receive waste water from an inlet and is swingable about a horizontal axis. When a predetermined volume of waste water is received by the second container it will swing around its axis and deliver its contents into the first container. Swinging movement of the second container also supplies cleaning liquids kept in separate containers into said first container. The second container is asymmetrically shaped and is divided into two chambers communicating with one another.

Patented March 30, 1971

INVENTOR:
B. Waller
BY
Richards & Geier
ATTORNEYS

Patented March 30, 1971 3,572,642

INVENTOR:
B. Waller
BY
Richards & Geier
ATTORNEYS 3,572,642

PURIFICATION OF WATER

DESCRIPTION OF THE INVENTION

The present invention relates to a device for mixing two or more liquids in prescribed portions with waste water including in combination a principal container, an outlet, a second container arranged essentially inside said principal container, said second container being swingably arranged about a horizontal axis and adapted to receiving waste water from an inlet, said second container, when having a prescribed volume of waste water received from said inlet, being arranged to swing about said axis and to deliver its content into said principal container, said swinging movement of said second container effecting means for automatic supply of cleaning liquids, e.g. chemicals, into said principal container, whereby the cleaning liquids are kept in separate containers.

One object of the invention is to provide means so as to avoid coatings from the chemicals—crystals and other precipitations—blocking the mechanism for supply of cleaning liquids and thereby causing severe disturbance in the cleaning process.

Another object of the invention is to provide means to obtain a device for purifying waste water that works automatically only based on a simple mechanical construction and which is independent of electric currency or other sources of power.

Still another object of the invention is to obtain a device which works irrespective of the character of the waste water, that is, irrespective if the waste water is more or less viscous.

The following is a specification of the invention references being made to the enclosed drawings of which:

Figure 1:
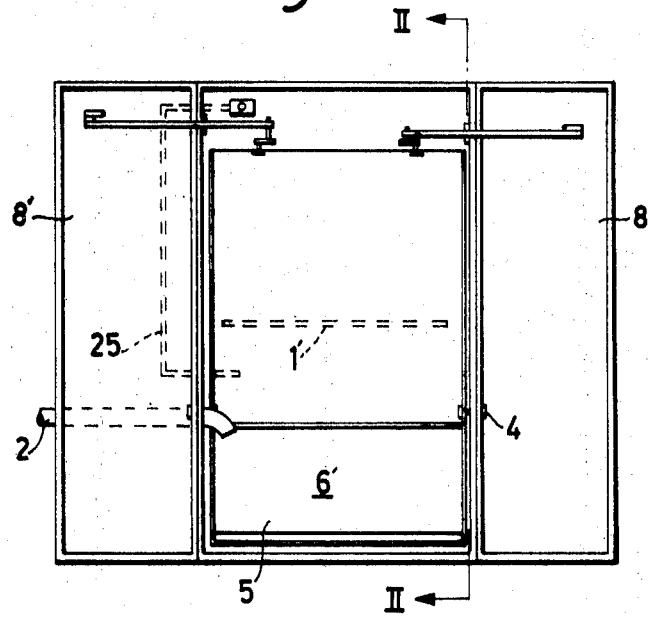
FIG. 1 is a top view of the improved device.

The improved device consists of a preferably rectangular, principal container 1 which has an outlet 3 for the mixed liquids. As second container 5 is arrange essentially within the principal container 1 and is swingably carried by a horizontal axis 4. The second container 5 has a dissymmetrical shaping and its center of gravity is eccentrically arranged in relation to the position of the axis 4.

In the rear part the second container 5 carries what is hereinafter called secondary container 6, and consisting of guiding plates. This secondary container 6 communicates backwards with the second swingable container 5. The inlet 2 for the waste water is arranged above the axis 4 and is arranged as to deliver the waste water directly into said secondary container.

The principal container 1 is provided with a partition wall 1' which extends above the outlet pipe but terminates above the bottom of the principal container 1 thereby dividing the container 1 into two chambers communicating with each other.

The bottom of the swingable, second container 5 is also provided with downwardly directed pins 17.

Upon the liquid surface of one of the chambers of the principal container is a floating body 7 which essentially covers said surface. This float body 7 may consist of a perforated plate and eventually on its lower side carry an auxiliary body 7'. The means 7, 7' normally float diagonally on the surface (FIG. 2), thereby with its front part extending somewhat above the surface.

The cleaning liquids to be added to the waste water are kept in separate containers 8, 8' arranged on opposite sides of the principal container 1 and contain suitable chemicals or chemical combinations.

Figure 2:
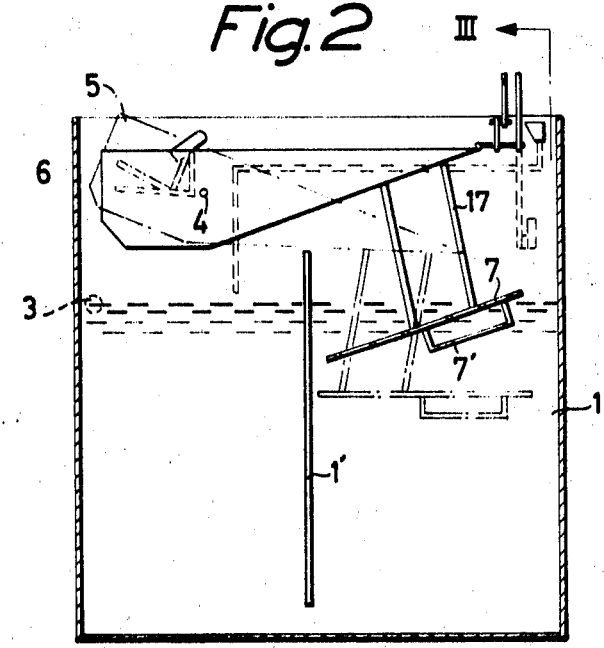
FIG. 2 is a side view of the device according to FIG. 1.
Figure 3:
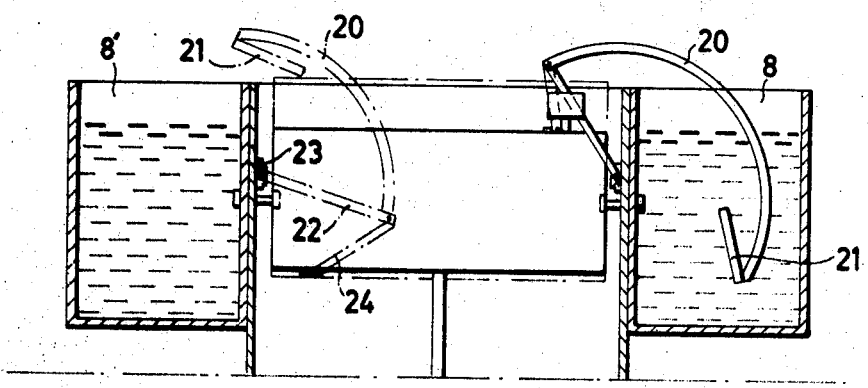
FIG. 3 is a section along line III—III in FIG. 2.

With reference to FIG. 1—3, a device for the supply of a cleaning liquid to the principal container 1 consists of an essentially arched, rigid member 20, one end of which carries a receptacle 21 the size of which is adapted to contain a certain volume of cleaning liquid. The opposite end of the arched member 20 is equipped with or formed as a radial directed arm 22, the arm 22 is linked to the wall of the principal container 1 at 23. The arched member 20 is preferably formed as a segment of an arc and with its imagined center at 23. A transmission arm 24 is linked to the arched member 20 as well as to the front portion of the swingable, second container 2. In this example there are two different containers 8, 8' containing two different cleaning liquids and consequently two identical supply arrangements are arranged as described above.

As waste water is supplied through the inlet 2 it runs into the secondary chamber 6 and further into the swingable, second container 5. When a certain volume of waste water has filled or almost filled said container 5, this container will tip about the axis 4 and deliver its content to the principal container 1 (shown in dotted lines in FIG. 2). It is obvious that a certain volume of waste water then will remain in the secondary chamber 6 and serve as a counterweight forcing the container 5 to return to its horizontal position as soon as it has been emptied. It is also obvious that the feeding devices 20, 21, 22 will participate when the container 5 is swung about its axis 4 and deliver the contents of the vessels 21 into the container 1 which appears from FIG. 3. The vessels 21 will consequently remain under the surface of the cleaning liquids during the filling of the swingable container 5 and come in contact with the surrounding air only during the short time the container, is emptied, which prevents precipitations. The cleaning liquid of the container 8' is emitted at the front portion of the principal container 1 and comes into contact with the plate 7. As the pins 17 at the swing movement of container 5 will press down the float body 7, 7' below the liquid level, fluid flows will arise which accelerate the mixing of the waste water and the cleaning liquid. Similar flows arise of course when the means 7, 7' return up to the surface.

The feeding device for the other cleaning liquid in the container 8 delivers the content of its vessel 21 to a pipe 25 for outlet in the container 1 on the other side of the participation wall 1'.

By the shape of the container 5 with the rear secondary container 6 and the liquid being left there as a counterweight at the emptying movement, the container 5 has normally no difficulties in returning to refilling position, and in doing so, simultaneously bringing back the feeding devices. In case the waste water is viscous or even very viscous the pins 17 of the container 5 will in emptying position form below be effected by the body 7, alternatively with help from the body 7' which with a certain fixed force practices an upwards directed pressure and which together with the previously described counterweight bring the container 5 even in such cases to return without difficulty to refilling position together with the feeding devices for the chemicals.

Except the above-mentioned function the pins 17 also cooperate at the bottom of the swing box with the body 7 to partly absorb those on the axis 4 working forces at the rough emptying movement of the container 5 and produce a softer emptying movement.

The dividing of the container 1 into different chambers aims to break down the bacteria comparatively fast in the greater chamber, where the primal compounding takes place and the cleaned water is gradually fed in from beneath into the smaller chamber, the wall of which is furnished with the outlet 3.

Figure 4:
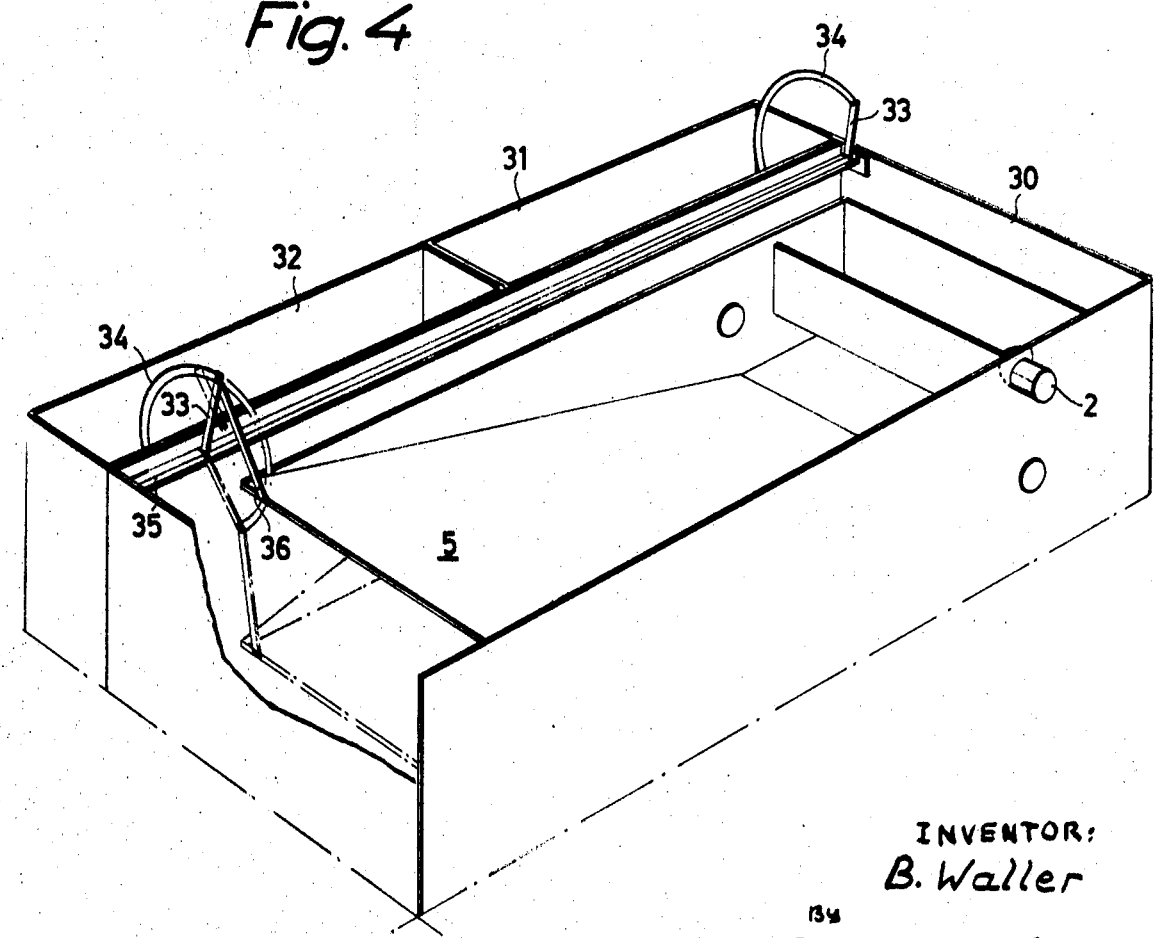
FIG. 4 is a modified example of the mechanism for supplying cleaning liquid to the principal container.

FIG. 4 shows a somewhat modified construction of the devices only for the feeding of chemicals and with the help of which the number of containers for chemicals approximately can be added and still by simple methods get a transport of a certain volume of chemicals from each container to that liquid intended for cleaning. The principal container, i.e. the container where the cleaning process takes place, is here designated with 30 and along one side of this container two containers 31, 32 are arranged containing chemicals. The radial directed arms 33 of the arched members 34 are with one end connected to a pivotally arranged axis 35, that is common for all of the feeding devices. For the cooperation of the feeding devices with the swingable second container 5, the one end of the arm 33 of at least one of the feeding devices connected to one end of a transmission arm 36, the opposite end of which is linked to the front portion of the swingable container 5. It is easily understood that this makes it possible to add other chemicals only by extending the container 30, corresponding chemical containers, and axis 35.

It is obvious that the devices for the supply of chemicals also can be made of wires or similar which at one part is connected with a dose-vessel and at the other connected with the front of the container 5. Rollers or other guide means can thereby be arranged at suitable places.

I claim:

1. Device for mixing two or more liquids in prescribed portions with waste water, including in combination a principal container, an outlet, a second container arranged essentially inside said principal container, said second container being swingably arranged about a horizontal axis and adapted to receive waste water from an inlet, said second container, when containing a prescribed volume of waste water received from said inlet, being arranged to swing about said axis and to deliver its content into said principal container, said swinging movement effecting means for automatic supply of cleaning liquids, e.g. chemicals, into said principal container, said cleaning liquids being kept in separate containers, said swingable second container having an asymmetrical shaping and being eccentrically arranged and is further divided into two chambers communicating with each other, the front part of said swingable second container being combined one end of means, the other end of said means each being provided with receptacle, said receptacles having a position below the surface of said cleaning liquids when said swingable second container is in its horizontal filling position.

2. Device according to claim 1, whereby said containers containing cleaning liquids are arranged along one side of said principal container a pivoted axis arranged inside the principal container and along its sidewall, arched members being connected to said axis via arms, at least one of said arms being pivotally connected to the front portion of swingable second container.

3. Device according to claim 1, whereby the bottom of the swingable second container is provided with downwardly directed arms, said arms pressing down a float body, that normally rests in a position upon the surface of the liquid of the principal container, when the swingable second container moves downwardly to empty its content.

4. Device according to claim 3, whereby the float body is arranged to cover the greater part of one of the two chambers of the principal container and also is furnished with holes, cuts or the like.

5. Device according to claim 4, whereby the float body is furnished with an auxiliary body.

6. Device for mixing two or more liquids in prescribed portions with waste water, including in combination a principal container, an outlet, a second container arranged essentially inside said principal container, said second container being swingably arranged about a horizontal axis and adapted to receive waste water from an inlet, said second container when containing a prescribed volume of waste water received from said inlet, being arranged to swing about said axis and to deliver its content into said principal container, said swinging movement effecting means for automatic supply of cleaning liquids, e.g. chemicals into said principal container, said cleaning liquids being kept in separate containers, said swingable second container having an asymmetrical shaping and being eccentrically arranged and is further divided into two chambers communicating with each other, the front part of said swingable second container being combined one end of means, the other end of said means each being provided with receptacle, said receptacles having in position below the surface of said cleaning liquids when said swingable second container is in its horizontal filling position. One of the chambers of said swingable second container being formed as a secondary container arranged within said swingable second container, said waste water being fed through said inlet directly to said secondary container, said secondary container serving as a counterweight when the second container has swung to an emptying position and effects said second container to return to its filling position.

7. Device for mixing two or more liquids in prescribed portions with waste water, including in combination a principal container, an outlet, a second container arranged essentially inside said principal container, said second container being swingably arranged about a horizontal axis and adapted to receiving waste water from an inlet, said second container, when containing a prescribed volume of waste water received from said inlet, being arranged to swing about said axis and to deliver its content into said principal container, said swinging movement effecting means for automatic supply of cleaning liquids, e.g. chemicals into said principal container, said cleaning liquids being kept in separate containers, said swingable second container having an asymmetrical shaping and being eccentrically arranged and is further divided into two chambers communicating with each other, the front part of said swingable second container being combined one end of means, the other end of said means each being provided with receptacle, said receptacles having a position below the surface of said cleaning liquids when said swingable second container is in its horizontal filling position, one of the chambers of said swingable second container being formed as a secondary container arranged within said swingable second container, said waste water being fed through said inlet directly to said secondary container, said secondary container serving as a counterweight when the second container has swung to an emptying position and effects said second container to return to its filling position, said means for the supply of cleaning liquids to the principal container each consists of an arched member, a second arm the one end of which is connected to said arched member, the opposite end of said second arm being pivotally connected to the wall of the principal container, one end of said arched member is provided with a receptacle which is kept below the surface of the cleaning liquid in the filling position of the swingable second container, whereby the opposite end of said arched member is provided with or formed as a transfer axis that in turn is linked to the front portion of said swingable second container.

8. Device according to claim 7, whereby the principal container by a vertical wall is divided into two chambers communicating with each other.

9. Device according to claim 7, whereby said containers containing cleaning liquids are arranged on opposite sides of the principal container and that one end of said supply means are connected with the front portion of the swingable second container, one of said receptacles being emptied into one of the chambers of the principal container whereas the content of the second receptacle via a pipe is emptied into the other chamber of said principal container.